United States Patent
Bisht et al.

(10) Patent No.: US 12,119,981 B2
(45) Date of Patent: Oct. 15, 2024

(54) IMPROVING SOFTWARE DEFINED NETWORKING CONTROLLER AVAILABILITY USING MACHINE LEARNING TECHNIQUES

(71) Applicant: Telefonaktiebolaget LM Ericsson (publ), Stockholm (SE)

(72) Inventors: Ashutosh Bisht, Bangalore (IN); Siva Kumar Perumalla, Bangalore (IN); Aakash Agarwal, Rajasthan (IN); Tanmoy Bhowmik, Bangalore (IN); Hema Gopalakrishnan, Chennai (IN); Hanamantagoud V Kandagal, Bagalkot (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/756,907

(22) PCT Filed: Dec. 5, 2019

(86) PCT No.: PCT/IN2019/050882
§ 371 (c)(1),
(2) Date: Jun. 3, 2022

(87) PCT Pub. No.: WO2021/111455
PCT Pub. Date: Jun. 10, 2021

(65) Prior Publication Data
US 2023/0015709 A1    Jan. 19, 2023

(51) Int. Cl.
*H04L 41/06* (2022.01)
*H04L 41/16* (2022.01)

(52) U.S. Cl.
CPC .............. *H04L 41/06* (2013.01); *H04L 41/16* (2013.01)

(58) Field of Classification Search
CPC ....... H04L 41/06; H04L 41/16; H04L 41/147; H04L 47/127; H04L 47/83
See application file for complete search history.

(56) References Cited

U.S. PATENT DOCUMENTS 10,070,328 B2 *   9/2018   Anerousis ............. H04W 24/08
2015/0317197 A1   11/2015   Blair
(Continued)

FOREIGN PATENT DOCUMENTS

CN   110011869   *   7/2019
CN   110493146 A       11/2019

OTHER PUBLICATIONS

International Search Report and Written Opinion for Application No. PCT/IN2019/050882, Mar. 2, 2020, 11 pages.
(Continued)

*Primary Examiner* — Glenton B Burgess
*Assistant Examiner* — Patrick F Ngankam
(74) *Attorney, Agent, or Firm* — Nicholson De Vos Webster & Elliott LLP

(57) ABSTRACT

A method of managing a controller of a software defined networking (SDN) network is implemented by a computing device in the SDN network. The method includes receiving status information for the controller, receiving usage information for the operating environment, generating at least one failure prediction for the controller based on the received status information, and outputting prediction information for the at least one failure prediction.

9 Claims, 6 Drawing Sheets

(56) References Cited

U.S. PATENT DOCUMENTS

| | | | |
|---|---|---|---|
| 2016/0285545 A1* | 9/2016 | Schmidtke | H04Q 11/0062 |
| 2017/0126792 A1* | 5/2017 | Halpern | H04L 67/1001 |
| 2017/0250923 A1* | 8/2017 | Eker | H04L 47/801 |
| 2019/0098043 A1 | 3/2019 | Banerjee et al. | |

OTHER PUBLICATIONS

International Preliminary Report on Patentability for Application No. PCT/IN2019/050882, Aug. 11, 2020, 10 pages.

Nader Bouacida et al., "Failure Mitigation in Software Defined Networking Employing Load Type Prediction," 2017, 7 pages, IEEE ICC 2017 SAC Symposium SDN & NFV Track.

* cited by examiner

Using Neural Network for prediction

IMPROVING SOFTWARE DEFINED NETWORKING CONTROLLER AVAILABILITY USING MACHINE LEARNING TECHNIQUES

CROSS-REFERENCE TO RELATED APPLICATIONS

This application is a National stage of International Application No. PCT/IN2019/050882, filed Dec. 5, 2019, which is hereby incorporated by reference.

TECHNICAL FIELD

Embodiments of the invention relate to the field of network resource availability; and more specifically, to the use of machine learning to predict controller availability in a software defined networking (SDN) network.

BACKGROUND ART

Software-defined networking (SDN) networks facilitate rapid and open innovation at the network layer by providing a programmable network infrastructure. Flow control protocols such as OpenFlow provide standardized programmable network protocols for managing software defined switches in a network. These protocols enable dynamic programming of flow control policies in the SDN network. In an SDN network, the data-plane and the control plane are separated. The data path nodes (DPN) are simple forwarding engines that are programmed by the SDN Controller using standard south bound protocol rules.

A standard SDN implementation uses proactive approach where flow rules are installed in DPNs based on (logical) provisioning information and known/discovered (physical) topology information. In some scenarios, flow rules are installed in DPNs in a reactive manner. In these scenarios, packets from a DPN are forwarded to the SDN controller to be analyzed. The SDN controller then installs relevant flow rules for handling similar packets at the DPN. Examples of these scenarios can include discovery and support of movable Internet Protocol (MIP) addresses where an IP address is owned by different virtual machines (VMs) at different time instants (e.g., with virtual router redundancy protocol (VRRP) IPs), and routes for subnets (hidden) behind configured network ports.

Due to such reactive scenarios, SDN controller becomes susceptible to failure due to forwarded packets coming from DPNs and VNFs (Virtual Network Functions). DPNs and VNFs can behave in unexpected ways given the wide variety of devices, vendors, and developers involved in the deployment of DPNs and VNFs. The DPNs or VNFs can unexpectedly flood an SDN controller with various types of packets that can be difficult for the SDN controller to handle and for administrators to predict. This can result in the failure of the SDN controller and related services.

Machine learning involves the use of algorithms and statistical models in computer programs to enable computing devices to perform specific tasks without having specific instructions related to these tasks. Machine learning utilizes pattern recognition and inference to generate a mathematical model to perform the specific tasks. Typically, the machine learning algorithms receive training data to develop the mathematical model. The mathematical model is then applied to new input data to perform a task. For example, machine learning can be used in image recognition where a machine learning process is input a set of training images including a target object along with information about whether the object is found in each image, which is then used to build a target object recognition model. After training, new images can be input to the machine learning process, which applies the target object recognition model to determine whether the target object is present in the input image.

SUMMARY

In one embodiment, a method of managing a controller of a software defined networking (SDN) network is implemented by a computing device in the SDN network. The method includes receiving status information for the controller, receiving usage information for the operating environment, generating at least one failure prediction for the controller based on the received status information, and outputting prediction information for the at least one failure prediction.

In further embodiments, a machine-readable medium comprising computer program code which when executed by a computer carries out the method of managing the controller. A computing device includes a set of processors, and a non-transitory machine-readable medium having stored therein a prediction unit. The set of processors execute the prediction unit to implement the method of managing the controller. Another computing device includes a set of processors, and a non-transitory machine-readable medium having stored therein a set of virtual machines, and a prediction unit. The set of processors execute the set of virtual machines, the set of virtual machines execute the prediction unit to implement the method of managing the controller as a virtual network function (VNF).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
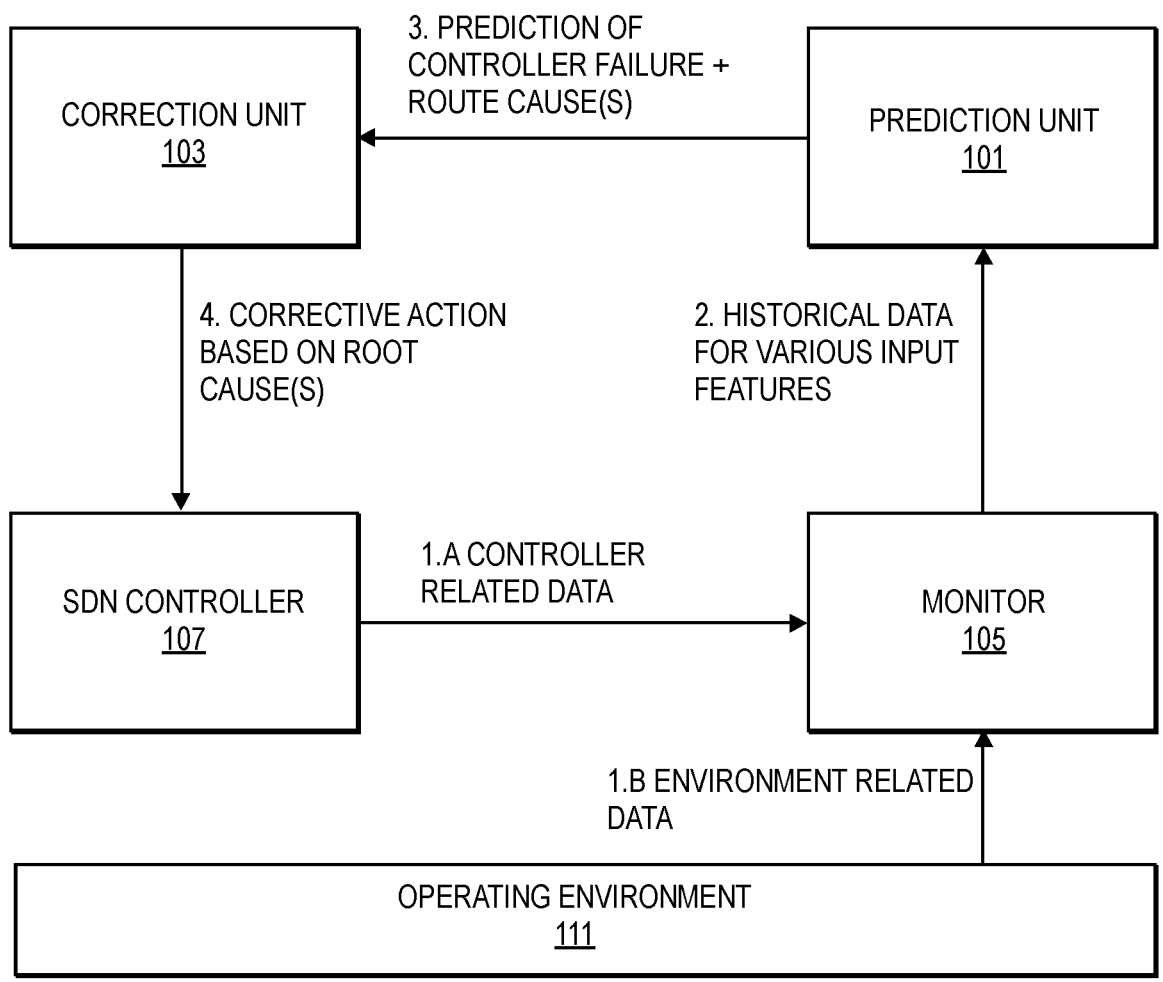
FIG. 1 is a diagram of one embodiment of a software defined networking (SDN) controller failure prediction system.

The following description describes methods and apparatus for a failure prediction system. In particular, the embodiments provide a failure prediction system for a controller in a Software Defined Networking (SDN) network. The embodiments include a monitor that collects controller and operating environment data that is provided to a prediction unit. The prediction unit uses historical collected data to develop a prediction model and applies the prediction model to current collected data to predict varying types of controller failure. The controller failure predictions are provided to a correction unit that can engage corrective actions to handle or avoid the predicted failure.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments utilize machine learning (ML) techniques to identify and mitigate anomalous operating conditions for a controller and to overcome issues of the prior art. In the prior art, system/node dimensioning (i.e., ensuring that the system and nodes have sufficient resources for their tasks) has been used to ensure stable operation for SDN controllers under expected load conditions. However, the prior art encounters several problems with existing SDN controller management techniques. For network function virtualization (NFV) based solutions, it is expected that third party virtual network functions (VNFs) will be managed by an independent NFVi (NFV infrastructure) solution provider. These third party VNF may have unexpected application behavior that may impact NFVi and SDN Controller performance. For example, a VNF may implement an unexpected high availability scheme that causes a lot of packets to be forwarded to the SDN controller, impacting SDN controller performance. In many existing deployments, the SDN controller is provided as a software application running with other applications (e.g., Openstack Nova, Neutron, etc.). Transient high resource usage by other applications can then impact SDN controller application performance. The number of operational parameters that need to be monitored (and corrective actions to be initiated) are increasing. Based on experience in the field, operational guidelines documents have been created for SDN controllers. The number of operational recommendations in the guidelines continually increases. Due to these issues, traditional system/node dimensioning techniques are not be enough to ensure that SDN controller is working in an effective and stable manner even during anomalous conditions.

The embodiments overcome these issues by providing a system and process to continuously predict SDN controller failure in advance (based on various input parameters) and to take corrective actions when a predicted probability of SDN controller failure is high. The embodiments utilize a predictive model (i.e., a machine learning model) that is trained to predict SDN controller failure in advance. In some embodiments, input parameters for the predictive model include network events received by the SDN Controller from southbound/data plane nodes (DPNs), network topology information (such as number of DPNs, number of network ports), execution environment parameters (e.g., usage of central processing units (CPUs), memory, network input/output (I/O)) and similar resources), internal SDN controller parameters (e.g., internal packet processing queue size and similar metrics), configurations received from northbound services (e.g., status information about L2 services configured, and L3 service configured), heart beat packet miss between SDN controller cluster nodes, and similar parameters and information. These input parameters (along with their historical values) are then used together for generating a prediction model using machine learning techniques.

The prediction model output can include a probability of SDN controller failure over a given time period (e.g., in the next 30 seconds), and the likely root cause(s) for SDN controller failure. When the SDN controller failure prediction probability exceeds a configured threshold, pre-defined correction actions can be performed. These corrective actions include, for example, dropping low priority messages (such as measurement data) coming from DPNs, delaying house-keeping tasks such a periodic snapshot of controller internal state for safekeeping, blocking or throttling certain messages or message sources, restarting SDN controller functions, and similar corrective actions. The embodiments can provide predictions of DPN disconnect due to SDN overload condition 15 seconds in advance using CPU usage and address resolution protocol (ARP) flood as input parameters. The predictive model is able to achieve a high accuracy (of about 87%).

The embodiments provide benefits over the prior art. The embodiments provide higher SDN controller availability even in anomalous conditions such as anomalous execution environment conditions and high load of network events since SDN controller failure prediction can be made in advance and corrective action can be taken before the SDN controller fails. The embodiments provide automatic identification of optimal threshold values and their duration (of threshold breach) for multiple combinations of input features (e.g., network load conditions, environment condition, and similar conditions) that could cause SDN controller failure (e.g., during prediction model training/testing phase), and automatic detection of breach of threshold values for multiple combinations of input features such as network load conditions, environment conditions that trigger corrective actions to prevent SDN controller failure (during operational phase).

FIG. 1 is a diagram of one embodiment of a software defined networking (SDN) controller failure prediction system. The SDN controller failure prediction system 100 includes a set of SDN controllers 107, a set of monitors 105, a set of prediction units 101, a set of correction units 103, and an operating environment 111. A 'set,' as used herein can include any positive whole number of items including one item. The components can be executed on separate computing devices or any combination of the components can be executed within the same computing device. In some embodiments, the components and subcomponents thereof are distributed any combination and number of computing devices.

In some embodiments, the components can have a one to one or one to many correspondence. For example, a single monitor 105 can collect data for a given SDN controller 107, which in turn is managed by a single prediction unit 101 and correction unit 103. In other embodiments, the monitor 105, prediction unit 101, and/or correction unit 103 can manage any number of SDN controllers 107. The components can generally execute in a shared operating environment 111. The operating environment 111 encompasses a set of computing devices that can be independent or that are part of a cloud execution environment. The operating environment 111 can encompass any number of computing resources (processors, storage, networking, and similar resources) that support the operation of the other components and in particular the SDN controller 107. For sake of clarity and conciseness, the operating environment 111 can be discussed herein primarily as a single shared set of computing resources (e.g., a CPU, memory, network I/O), however, one skilled in the art would appreciate that the operating environment can include any number and configuration of such computing resources that support the components and/or the SDN controller 107.

The monitor 105 can collect data to be input to the prediction unit 101. The monitor 105 can collect data from multiple sources. These sources can include the operating environment 111 (e.g., time series data collected for CPUs, memory, disk I/O, and network I/O), the SDN controller 107, and a resource profiled for the SDN controller. The information collected from the SDN controller 107 can include network events (e.g., time series data for events coming from southbound/network such as packet-ins, and counter data from DPNs), topology information including the configured and connected DPNs, number of network ports, and similar information, network configuration including the network services enabled such as L2 services and L3 services, the internal controller state parameters such as current queue sizes, and heart beat packet misses between the SDN controller cluster nodes. The resource profile used for SDN controller can be one of several types of profiles. For example, the profiles can be small, medium and large profiles that cater to different numbers of managed DPNs. The different profiles have different number of virtual CPU and random access memory (RAM) dimensioned for the SDN controller application.

The prediction unit 101 can by any type of machine learning component that is trained and configured to generate SDN controller related failure predictions. This component provides predictions for the failure of SDN controller in advance of the failures. The predictions can be made at any point in time prior to the failure with varying levels of accuracy. Apart from the failure prediction, the prediction unit also classifies the failure condition(s) into one or more root causes. In some embodiments, the categories of possible root causes include a high number of network events, a high CPU utilization, and a high disk I/O. The prediction unit 101 uses data collected by monitor 105 to make the predictions.

Figure 2:
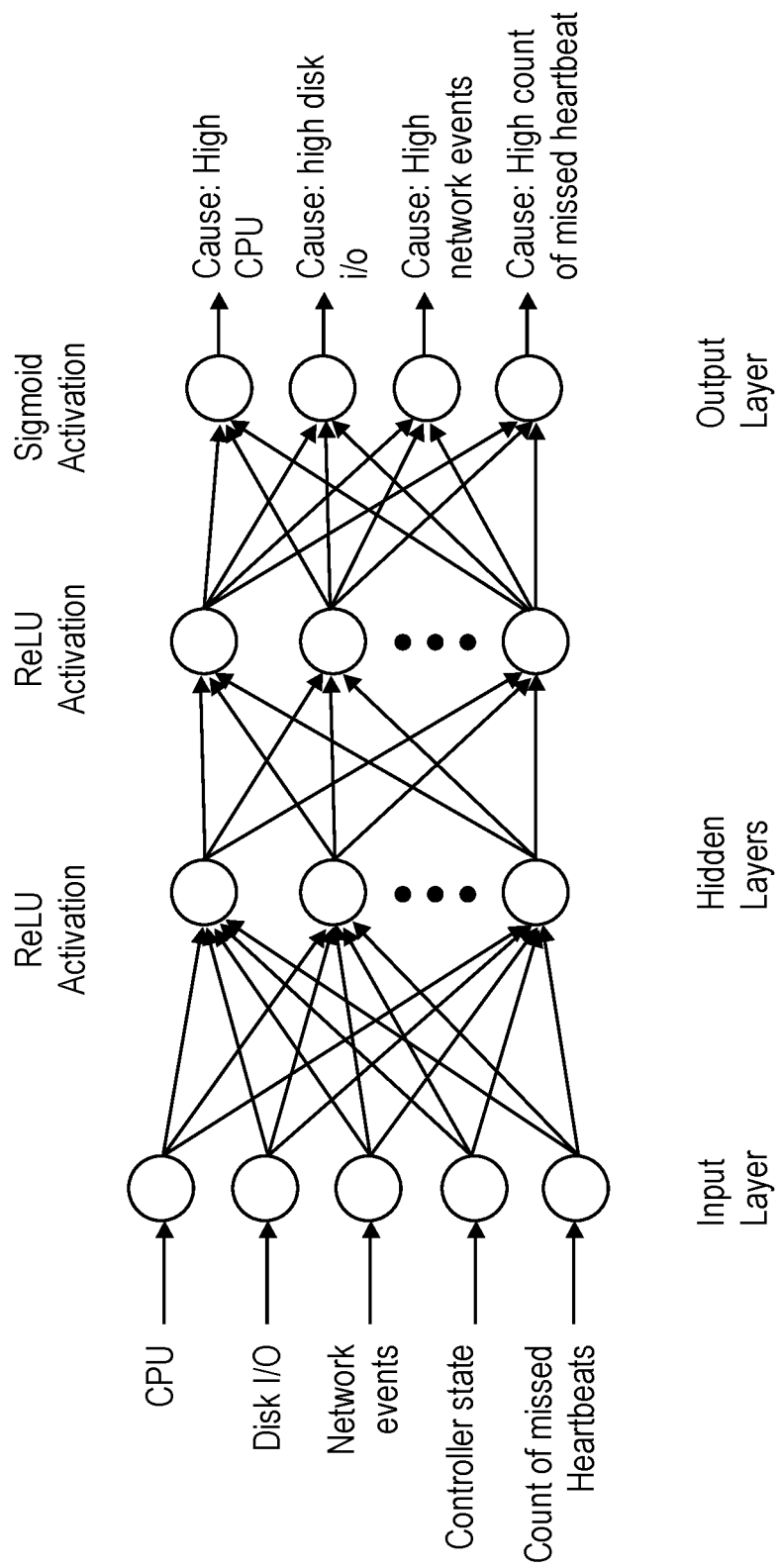
FIG. 2 is a diagram of an example neural network trained to predict certain failure causes.

In the embodiments, the prediction unit 101 is configured to predict a rare or anomalous event that causes SDN controller failure. Any machine learning techniques can be utilized that are capable of being trained for at least one type of SDN controller failure. In one example embodiment, an 'Isolation Forest' machine learning model can be used for predictions. In other embodiments, other machine learning model/techniques can also be used. FIG. 2 provides an example where a neural network is utilized as part of the prediction unit 101.

FIG. 2 is a diagram of an example neural network trained to predict certain failure causes. The use of a neural network is provided by way of example and not limitation. In the illustrated example, the neural network (NN) includes an input layer, two hidden layers, and an output layer. The two hidden layers are shown by way of example and not limitation. Other machine learning models including other neural network configurations might have more than two hidden layers.

In the example as illustrated, the nodes in each layer are connected to the nodes in the next adjacent layer. Rectified linear unit (ReLU) activation is used in the hidden layer neurons and sigmoid activation is used in the output layer neurons. The example neural network is trained by adjusting the weights of the connections with the help of a gradient descent algorithm. Other models might use other activation functions and other ways of adjusting the weights. The hidden layers process the input to determine whether the received input is indicative of a performance issue in the network. The output layer then outputs a prediction probability for failure, due to cause-1 (such as high CPU), failure, due to cause-2 (such as high disk I/O), failure, due to cause-3 (such as high count of network events), and failure, due to cause-4 (such as high count of missed heartbeats). In other embodiments any combination of such failure causes can be output. In addition, the output can include or indicate a likelihood or accuracy indicator (e.g., a 0-100% valuation).

During a training phase, threshold values for each of the output classes are tuned to reduce the desired error function (such as a cross-entropy cost function). For any input, multiple causes (output) can be activated and corrective actions can be taken for each of the output causes that exceed a threshold). If all the causes are below a threshold, if the prediction unit infers normal operation for the SDN controller. In such case, no correction action is triggered.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
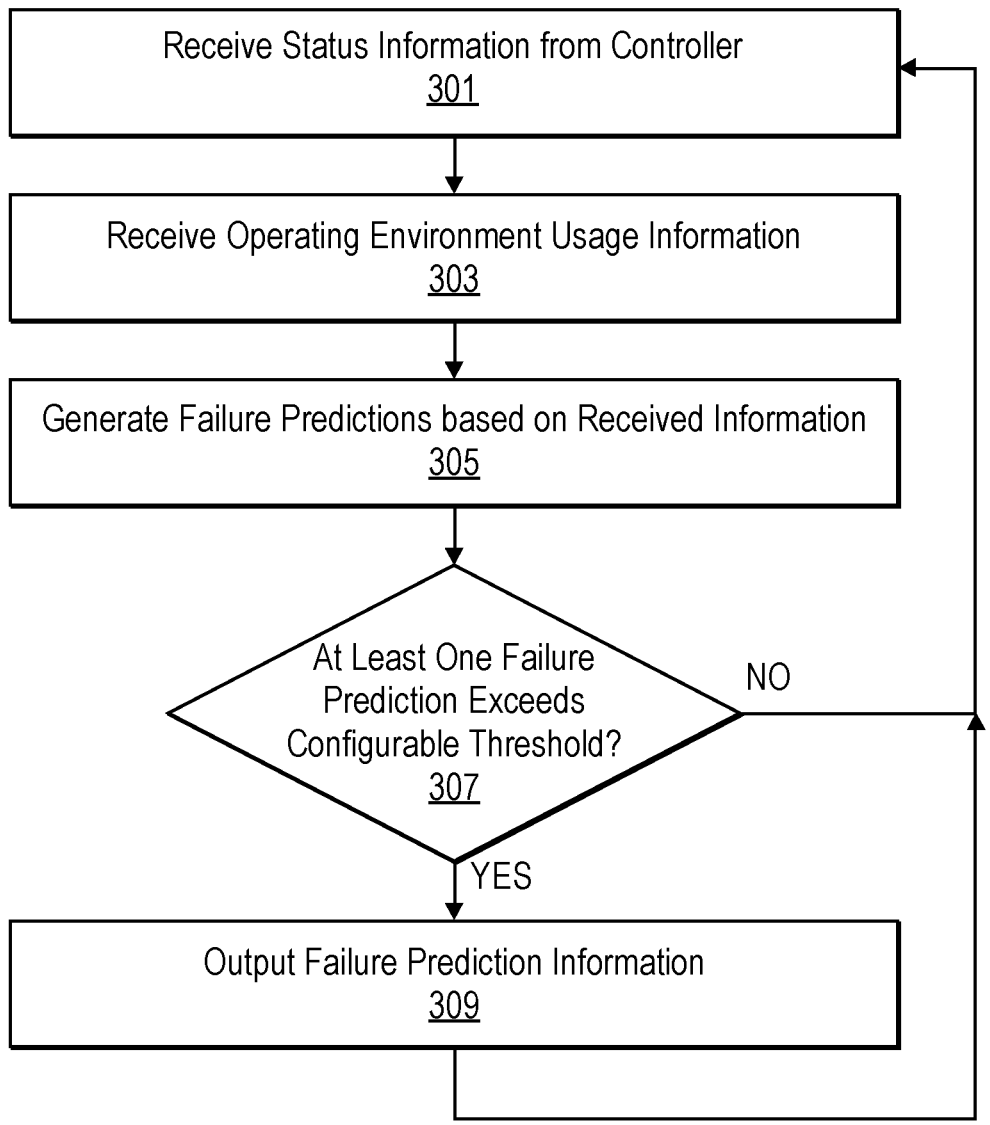
FIG. 3 is a flowchart of one embodiment of a process of a prediction unit in the SDN controller failure prediction system.

FIG. 3 is a flowchart of one embodiment of a process of a prediction unit in the SDN controller failure prediction system. The illustrated process describes the runtime operation of the prediction unit. The prediction unit can be trained in a separate process according to the machine learning model utilized. For example, the prediction unit can be trained on prior collections of time series data from the SDN controller and the operating environment along with actual failure events such that the machine learning models infer operating environment conditions and SDN controller parameters that indicate an impending failure.

In runtime operation, the prediction unit receives continuous or periodic updates of status information for the SDN controller including information such as packet processing queue lengths, and similar parameters (Block 301). In parallel, the prediction unit receives operating environment information (Block 305). The operating environment information can include metrics on resource utilization including CPU usage, memory usage, disk I/O, network I/O, and similar resource usage metrics. The operating environment information and the SDN controller information can be collected on behalf of the prediction unit by a monitor or similar component. Separate monitor instances can collect information per prediction unit, per information source, or similar configuration.

The prediction unit applies received input periodically, as received, or continuously to the trained prediction model. The input to the prediction model generates an updated output for each of the categories of failure predicted by the prediction model (Block 307). A check is made whether any of the failure prediction outputs indicate that a failure is imminent (i.e., the failure predictions exceed a threshold value). If none of the failure prediction outputs exceed a threshold, then the prediction unit continues to update predictions as the input data is updated.

If one or more of the failure prediction outputs exceed a threshold to indicate an imminent failure, then failure information indicating a type and/or timing of the predicted failure is output (Block 309). In one embodiment, the predicted failure can be sent to a correction unit to initiate a correction or to manage the failure. The predicted failure information that exceeds a threshold can be sent to a correction unit, the SDN controller, a DPN or similar component to manage the failure. In other embodiments, the raw predicted failure values are output by the prediction unit and the correction unit determines whether corrective action is required, for example whether a threshold has been exceeded. Each category of failure prediction can be a basis for separately triggering corrective actions, since each failure category can be handled by separate and distinct means.

Returning to a discussion of FIG. 1, the correction unit 103 is a component of the failure prediction system that triggers the corrective action to prevent the SDN controller 107 failure. Pre-configured rules can be used to trigger the corrective action. An example table that maps root-cause to-corrective-actions include:

TABLE 1

| Root Cause | Corrective Action |
| --- | --- |
| High number of Network events | Drop incoming low priority packets from DPN that is punting high number of network packets. |
| High CPU utilization | Stop low priority tasks such as housekeeping task related to memory consolidation |
| High disk i/o | Drop persistent storage of low priority measurement data coming from DPNs |

The diagram of FIG. 1 sets forth an example interaction between the component of the failure prediction system. The failure prediction system, as an initial step, can collect data at the monitor 105. Data is collected by monitor 105 from the SDN Controller 107 (Step 1.a) and operating environment 111 (Step 1.b). Current as well as historical values of input features (i.e., collected information) can be passed to prediction unit 101 (Step 2). Historical values can be used for training of the prediction model.

The prediction unit 101 makes SDN controller failure predictions based on input data provide by monitor (Step 3). The prediction unit 101 also classifies the failure conditions into one or more root cause(s). When the SDN controller failure probability is high (i.e. at least one of the failure predictions exceeds a configurable threshold), the correction unit 103 can trigger corrective actions based on pre-configured rules (Step 4).

As mentioned above, the prediction unit 101 utilizes the historical data (i.e., provided in Step 2) to train the prediction model. The prediction model can be any machine learning model that can be trained for failure prediction based on the SDN controller and operating environment inputs. The prediction model can be trained by executing multiple test scenarios that vary a single input feature (such as high CPU, high number of network events, or similar input feature), and that vary combinations of input features (such as high CPU and high number of network events). Normal SDN controller operating scenarios (to create baseline operating condition) are also input to the model.

Time series data for input features is collected for these scenarios. It is also included whether the affected SDN controller failed or worked correctly during execution of these scenarios. In case of SDN controller failure, the amount of time elapsed since the start of test is also noted. The prediction model is trained using the data collected in Step 2. The data can be labelled based on execution test results (SDN controller failed or not) and input features that were varied (such as high CPU).

Thus, the embodiments as described with relation to FIGS. 1-3 provide a stable and efficient operation of SDN controllers in cloud-based solutions such as NFVi that require large number of parameters to be configured. Furthermore, many of the parameters are co-related to one another. The embodiments utilize machine learning techniques to identify the threshold values and sustained duration of threshold breach of these parameters for stable SDN controller operation. The prediction unit utilizes machine learning techniques to predict the failure of SDN controller due to anomalies in various monitored parameter to take proactive corrective actions.

Figures 4A, 4B:
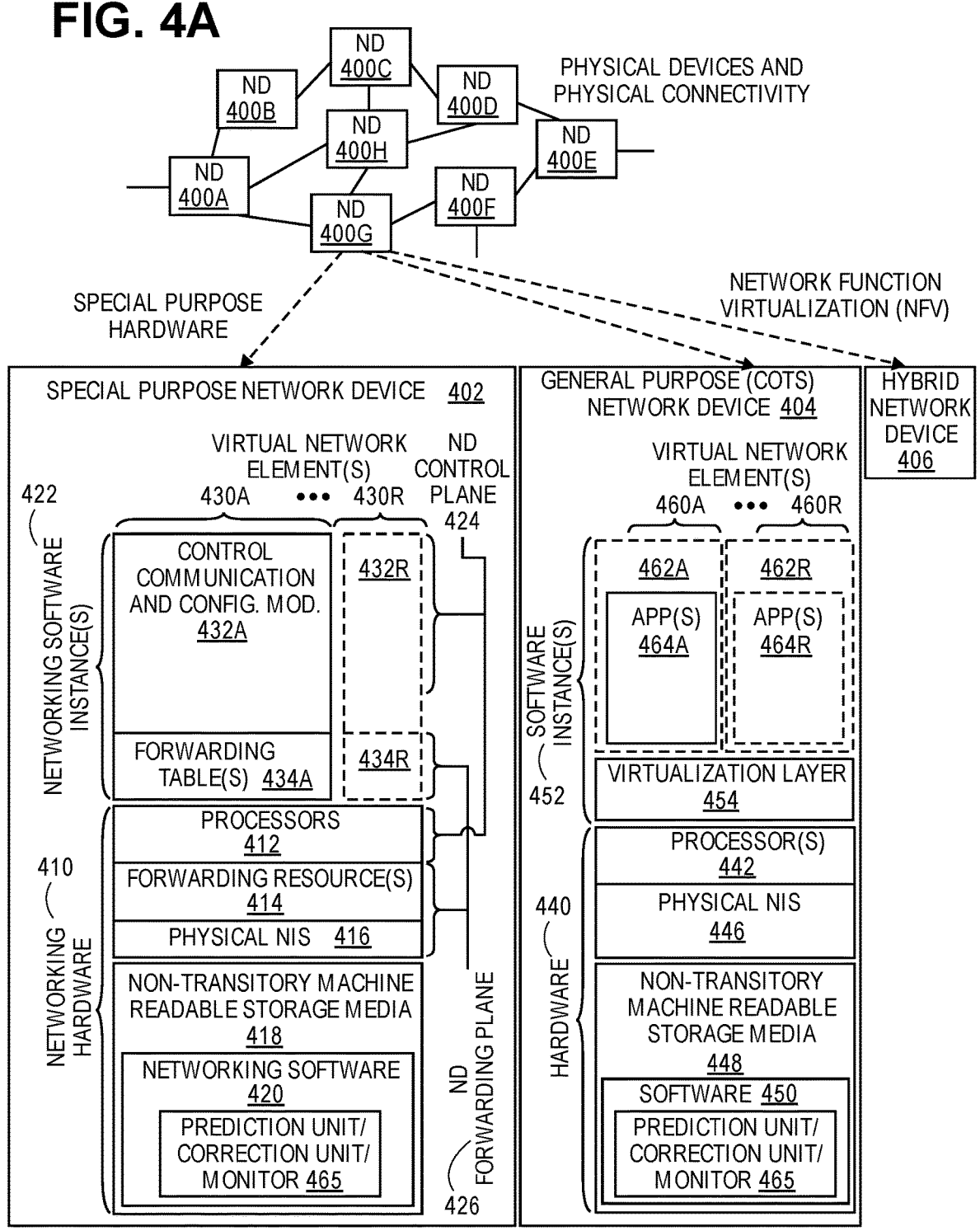
FIG. 4A illustrates connectivity between network devices (NDs) within an exemplary network, as well as three exemplary implementations of the NDs, according to some embodiments of the invention.
FIG. 4B illustrates an exemplary way to implement a special-purpose network device according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application—specific integrated—circuits (ASICs) and a special-purpose operating system (OS); and 2) a general purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416 (through which network connections are made, such as those shown by the connectivity between NDs 400A-H), as well as non-transitory machine readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

The networking software 420 can include any or all of the components implementing the failure prediction process and system including any one or more of the prediction unit, correction unit, monitor, or related components 465. These components can implement the processes and functions of the embodiments described herein.

The special-purpose network device 402 is often physically and/or logically considered to include: 1) a ND control plane 424 (sometimes referred to as a control plane) comprising the processor(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and physical NIs 446, as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The software 420 can include any or all of the components implementing the failure prediction process and system including any one or more of the prediction unit, correction unit, monitor, or related components 465. These components can implement the processes and functions of the embodiments described herein.

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the physical NI(s) 446, as well as optionally between the instances 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 4C:
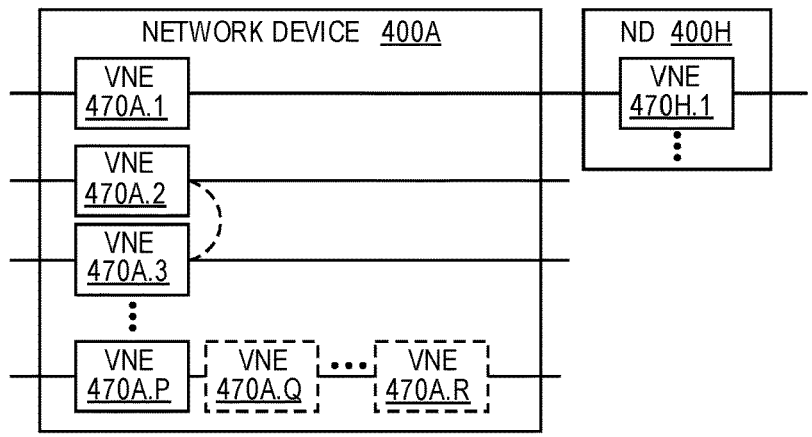
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software instances 462A-R may operate as servers; the same would be true for the hybrid network device 406; in the case of the special-purpose network device 402, one or more such servers could also be run on a virtualization layer executed by the processor(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 4D:
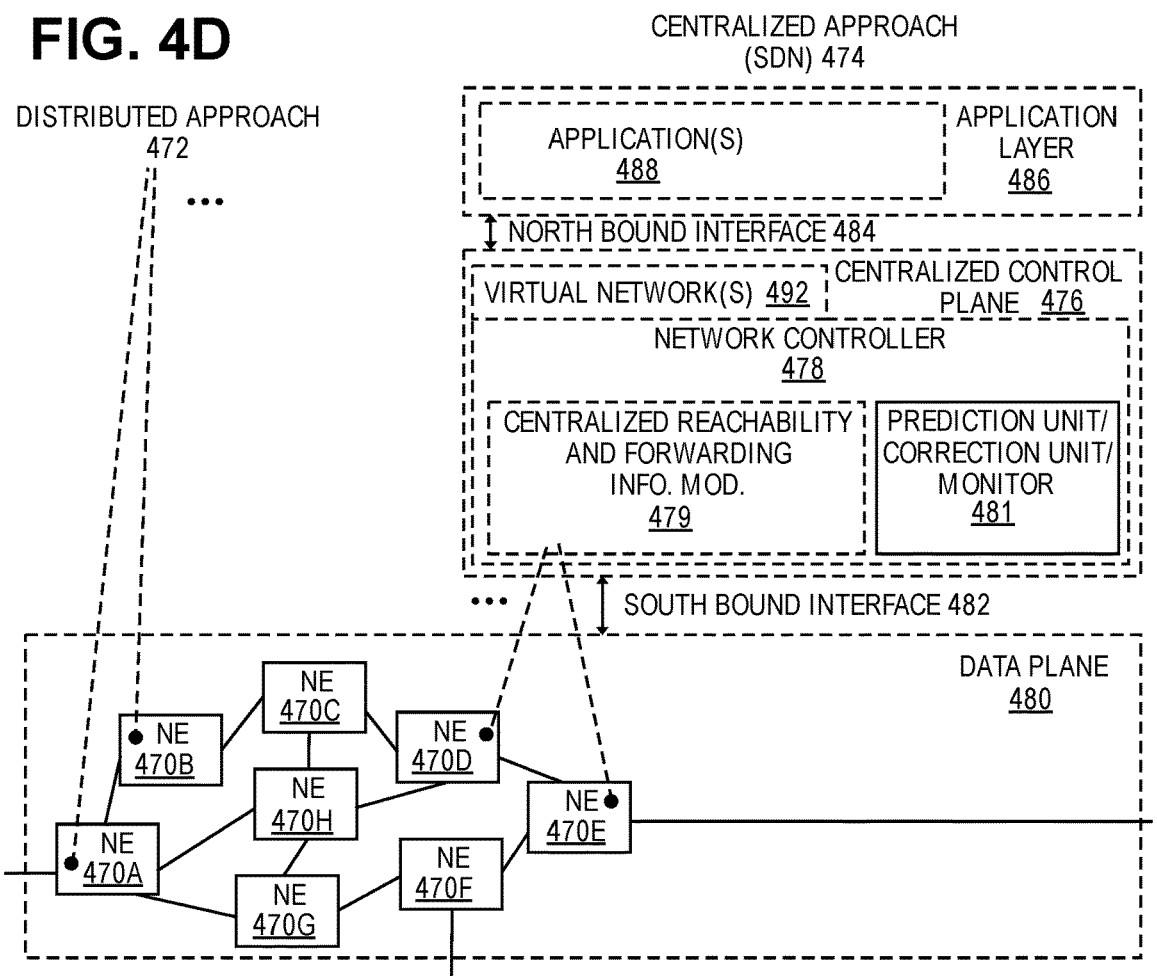
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 470A-H (e.g., the processor(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

The networking controller 478, applications 488 or similar aspects of the SDN controller and the associated operating environment can include any or all of the components implementing the failure prediction process and system including any one or more of the prediction unit, correction unit, monitor, or related components 481. These components can implement the processes and functions of the embodiments described herein.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the processor(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

Figure 4E:
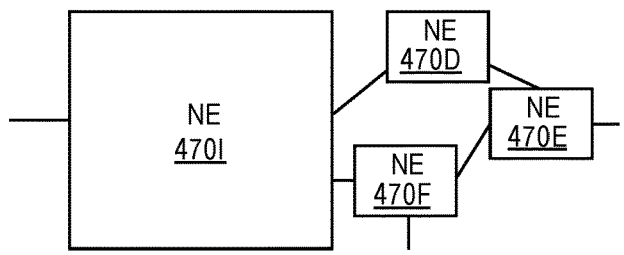
FIG. 4E illustrates the simple case of where each of the NDs implements a single NE, but a centralized control plane has abstracted multiple of the NEs in different NDs into (to represent) a single NE in one of the virtual network(s), according to some embodiments of the invention.
Figure 4F:
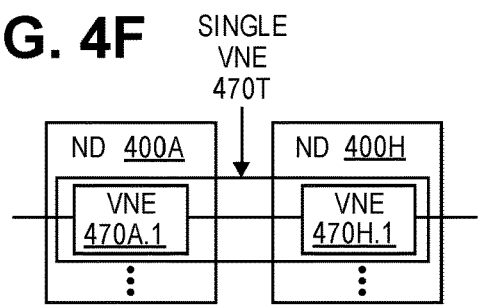
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 470I in one of the virtual network(s) 492 of FIG. 4D, according to some embodiments of the invention. FIG. 4E shows that in this virtual network, the NE 470I is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
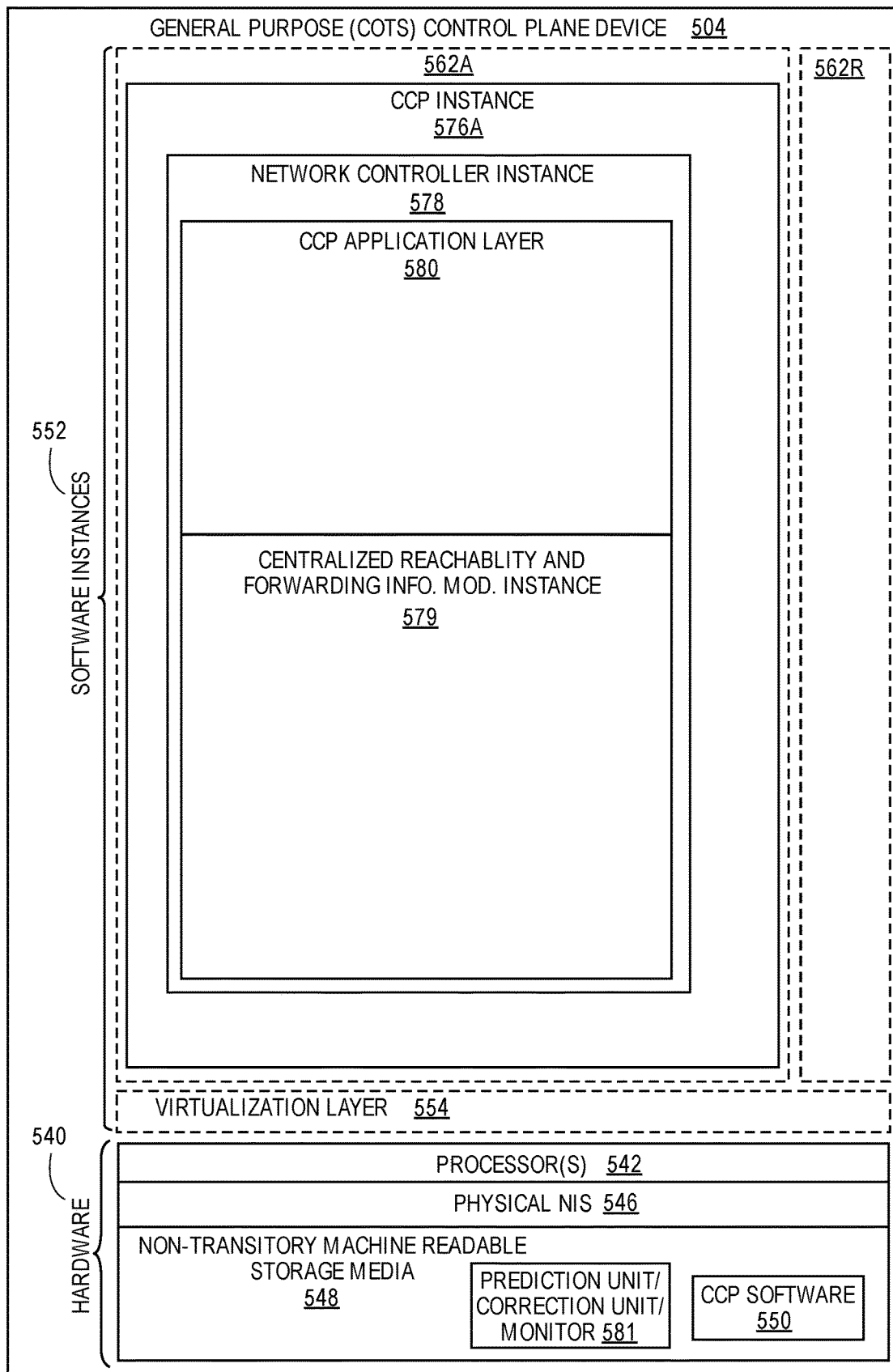
FIG. 5 illustrates a general purpose control plane device with centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and physical NIs 546, as well as non-transitory machine readable storage media 548 having stored therein centralized control plane (CCP) software 550.

The control plane device 504, controller instance 578 or similar aspects of the SDN controller and the associated operating environment can include any or all of the components implementing the failure prediction process and system including any one or more of the prediction unit, correction unit, monitor, or related components 581. These components can implement the processes and functions of the embodiments described herein.

In embodiments that use compute virtualization, the processor(s) 542 typically execute software to instantiate a virtualization layer 554 (e.g., in one embodiment the virtualization layer 554 represents the kernel of an operating system (or a shim executing on a base operating system) that allows for the creation of multiple instances 562A-R called software containers (representing separate user spaces and also called virtualization engines, virtual private servers, or jails) that may each be used to execute a set of one or more applications; in another embodiment the virtualization layer 554 represents a hypervisor (sometimes referred to as a virtual machine monitor (VMM)) or a hypervisor executing on top of a host operating system, and an application is run on top of a guest operating system within an instance 562A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 540, directly on a hypervisor represented by virtualization layer 554 (in which case the unikernel is sometimes described as running within a LibOS virtual machine), or in a software container represented by one of instances 562A-R). Again, in embodiments where compute virtualization is used, during operation an instance of the CCP software 550 (illustrated as CCP instance 576A) is executed (e.g., within the instance 562A) on the virtualization layer 554. In embodiments where compute virtualization is not used, the CCP instance 576A is executed, as a unikernel or on top of a host operating system, on the "bare metal" general purpose control plane device 504. The instantiation of the CCP instance 576A, as well as the virtualization layer 554 and instances 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user—interfaces). At a more abstract level, this CCP application layer 580 within the centralized control plane 476 works with virtual network view(s) (logical view(s) of the network) and the middleware layer provides the conversion from the virtual networks to the physical view.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method of managing a software defined networking (SDN) controller of an SDN network implemented by a computing device in the SDN network, the method comprising:
    receiving status information for the SDN controller, wherein the status information for the SDN controller comprises network configuration and network events;
    receiving usage information for an operating environment, wherein the operating environment includes processors, memories, and network resources, and wherein the usage information comprises usage of the processors, memories, and network resources;
    generating, by use of a machine learning model, at least one failure prediction for the SDN controller based on the status information for the SDN controller, the usage information of the operating environment, historic status information of the SDN controller, and historic usage information of the operating environment, wherein the at least one failure prediction for the SDN controller is generated by the machine learning model utilizing the status information and the usage information as inputs to the machine learning model, and trained on historic status information of the SDN controller and historic usage information of the operating environment;
    determining whether the at least one failure prediction for the SDN controller exceeds a configured threshold;
    in response to the at least one failure prediction exceeding the configured threshold, outputting prediction information as an output from the machine learning model for the at least one failure prediction for the SDN controller, wherein the prediction information includes a probability of failure over a given time period and a root cause for failure of the SDN controller, wherein the root cause for failure is based on at least one input to the machine learning model; and
    sending the prediction information to a correction unit for the SDN controller or to the SDN controller to implement a corrective action by the SDN controller for the root cause for failure.

2. The method of claim 1, wherein the status information for the SDN controller and the usage information for the operating environment is received from a monitor.

3. The method of claim 1, wherein the status information for the SDN controller includes internal packet processing queue sizes.

4. A non-transitory machine-readable storage medium comprising computer program code which, when executed by a computer managing a software defined networking (SDN) controller of an SDN network implemented by a computing device in the SDN network, causes performing of operations comprising:
    receiving status information for the SDN controller, wherein the status information for the SDN controller comprises network configuration and network events;
    receiving usage information for an operating environment, wherein the operating environment includes processors, memories, and network resources, and wherein the usage information comprises usage of the processors, memories, and network resources;
    generating, by use of a machine learning model, at least one failure prediction for the SDN controller based on the status information for the SDN controller, the usage information of the operating environment, historic status information of the SDN controller, and historic usage information of the operating environment, wherein the at least one failure prediction for the SDN controller is generated by the machine learning model utilizing the status information and the usage information as inputs to the machine learning model, and trained on historic status information of the SDN controller and historic usage information of the operating environment;
    determining whether the at least one failure prediction for the SDN controller exceeds a configured threshold;
    in response to the at least one failure prediction exceeding the configured threshold, outputting prediction information as an output from the machine learning model for the at least one failure prediction for the SDN controller, wherein the prediction information includes a probability of failure over a given time period and a root cause for failure of the SDN controller, wherein the root cause for failure is based on at least one input to the machine learning model; and
    sending the prediction information to a correction unit for the SDN controller or to the SDN controller to implement a corrective action by the SDN controller for the root cause for failure.

5. The non-transitory machine-readable storage medium of claim 4, wherein the status information for the SDN controller and the usage information for the operating environment is received from a monitor.

6. The non-transitory machine-readable storage medium of claim 4, wherein the status information for the SDN controller includes internal packet processing queue sizes.

7. A computing device for managing a software defined networking (SDN) controller of an SDN network implemented by the computing device in the SDN network, the computing device comprising:
    a set of processors; and
    a non-transitory machine-readable medium having stored therein a prediction unit, the set of processors to execute the prediction unit to:
        receive status information for the SDN controller, wherein the status information for the SDN controller comprises network configuration and network events;
        receive usage information for an operating environment;
        generate, by use of a machine learning model, at least one failure prediction for the SDN controller based on the status information for the SDN controller, the usage information of the operating environment, historic status information of the SDN controller, and historic usage information of the operating environment, wherein the at least one failure prediction for the SDN controller is generated by the machine learning model utilizing the status information and the usage information as inputs to the machine learning model, and trained on historic status information of the SDN controller and historic usage information of the operating environment;
        determine whether the at least one failure prediction for the SDN controller exceeds a configured threshold;
        in response to the at least one failure prediction exceeding the configured threshold, output prediction information as an output from the machine learning model for the at least one failure prediction for the SDN controller, wherein the prediction information includes a probability of failure over a given time period and a root cause for failure of the SDN controller, wherein the root cause for failure is based on at least one input to the machine learning model; and send the prediction information to a correction unit for the SDN controller or to the SDN controller to implement a corrective action by the SDN controller for the root cause for failure.

8. The computing device of claim 7, wherein the status information for the SDN controller and the usage information for the operating environment is received from a monitor.

9. The computing device of claim 7, wherein the status information for the SDN controller includes internal packet processing queue sizes.

* * * * *